B. D. KEMP.
NUT LOCK.
APPLICATION FILED FEB. 11, 1910.
962,642.
Patented June 28, 1910.
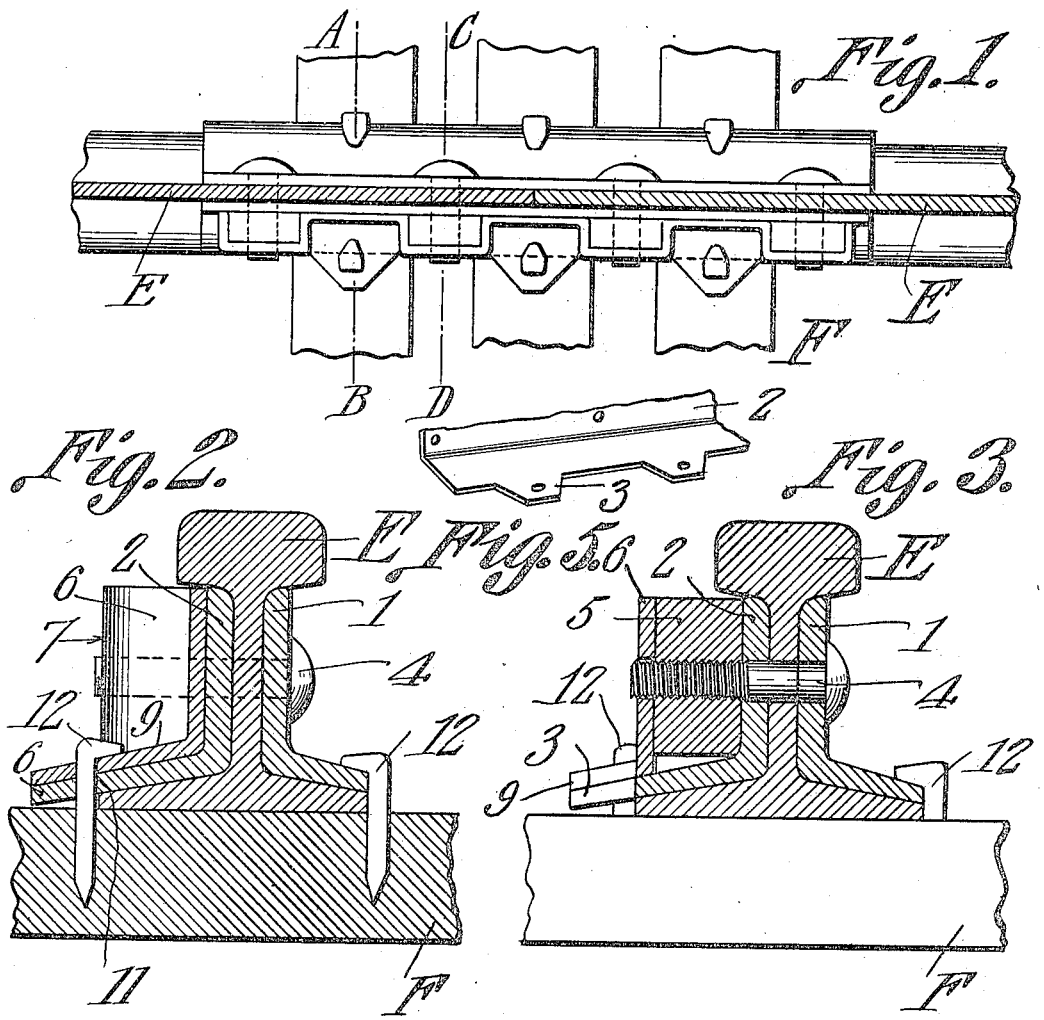
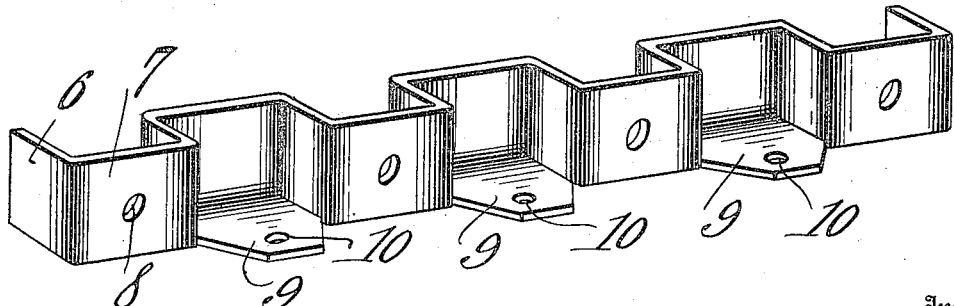
Fig. 4.
Witnesses
Inventor
Basel D. Kemp.
By
Attorneys

UNITED STATES PATENT OFFICE.

BASEL D. KEMP, OF GRACEMONT, OKLAHOMA.

NUT-LOCK.

962,642.  Specification of Letters Patent.  Patented June 28, 1910.

Application filed February 11, 1910. Serial No. 543,252.

*To all whom it may concern:*

Be it known that I, BASEL D. KEMP, a citizen of the United States, residing at Gracemont, in the county of Caddo and State of Oklahoma, have invented new and useful Nut-Locks, of which the following is a specification.

This invention relates to nut locks especially designed for use in connection with rail joints, one of the objects of the invention being to provide a simple form of lock whereby the series of nuts located at a joint can be held against movement relative to the bolts in a simple and efficient manner, the said lock being of such a character as to positively prevent the accidental rotation of the nut.

A further object is to provide a device of this character which is inexpensive and which can be readily placed in position without danger of mutilating the threads upon the bolts.

With these and other objects in view the invention consists of certain novel details of construction and combinations of parts hereinafter more fully described and pointed out in the claims.

In the accompanying drawing the preferred form of the invention has been shown.

In said drawing, Figure 1 is a plan view of a nut lock embodying the present improvements, the same being shown applied to a rail joint and the heads of the meeting rails being removed. Fig. 2 is an enlarged section on line A—B Fig. 1. Fig. 3 is an enlarged section on line C—D Fig. 1. Fig. 4 is a perspective view of the locking plate. Fig. 5 is a perspective view, on a reduced scale, of a portion of one of the fish plates.

Referring to the figures by characters of reference E, E designate the meeting portions of two rails, the webs and the base flanges thereof being engaged by fish plates 1 and 2, the fish plate 1 being provided with angular wings or extensions 3 along the bottom thereof and which project beyond the adjoining base flanges of the rails E. Bolts 4 of the usual form are extended through the fish plates and webs of the rails and are engaged by the ordinary forms of nuts 5.

The nut lock constituting the present improvements consists of a strip of metal such as has been indicated at 6, the said strip being provided at regular intervals with U-shaped portions 7, these portions being spaced apart distances equal to the distances between the nuts 5 so that when the plate is placed against the upstanding portion of the fish plates 2, each one of these extensions 7 will receive one of the nuts 5. Openings 8 are formed in the extensions for the reception of the threaded portions of the bolts 4. Tongues 9 are extended laterally from those portions of the strip 6 located between the extensions 7, these tongues being located upon the bottom edge of the strip 6 and being angular in outline so as to conform to the contour of the wings 3 on the fish plate 2. Openings 10 are formed within the tongues and register with corresponding openings formed within the wings 3 as indicated at 11.

In using the device herein described the nuts 5 are tightened on the bolts 4 in the usual manner, it being necessary to leave them with two opposite side faces perpendicular. The locking strip 6 is then placed against the upstanding portion of the fish plate 2 and with one of the nuts 5 disposed in each of the extensions 7. The tongues 9 will therefore rest upon the wings 3 and the threaded ends of the bolts 4 will project loosely into the openings 8. The openings 10 will register with the openings 11 and by driving spikes 12 through these registering openings and into the supporting tie F, it will be apparent that the locking strip 6 will be securely held upon the fish plate 2, and the nuts 5 and the said nuts will therefore be held against rotation upon the bolts.

Attention is directed to the fact that the locking strip herein described can be formed in a single piece of sheet metal, it being possible to produce it very cheaply. After the strip has once been placed in position the nuts will be securely held against rotation and inasmuch as the bolts extend loosely into the openings 8 it will be apparent that the threads thereon will be uninjured. The spikes 12 utilized for fastening the locking strip in place can also be employed for engaging the base flanges of the rails so as not only to hold said strip into position but also to fasten the rails to the ties.

Various changes can of course be made in the construction and arrangement of the parts without departing from the spirit or sacrificing any of the advantages of the invention as defined in the appended claims.

What is claimed is:—

1. A nut lock including an elongated metal strip having a plurality of laterally extending nut receiving extensions, and tongues interposed between said extensions and extending from the lower edge of the strip.

2. A nut lock including a single elongated metal strip having a series of substantially U-shaped nut receiving extensions, there being a bolt receiving opening in the intermediate portion of each extension, and tongues extending from the lower edge of the strip at points between the extensions, each tongue having a fastener receiving opening.

3. The combination with meeting rails and fish plates bolted thereto, one of said plates having wings extending from the base thereof, and beyond the sides of the rails, of nuts upon the bolts, an elongated locking strip having laterally extending nut receiving extensions, there being apertures within the intermediate portions of said extensions for the reception of the threaded ends of the bolts, and tongues extending laterally from the lower edge of the strip and between the extensions, said tongues resting upon the wings, there being registering openings within the wings and tongues and combined rail fastening and strip holding devices extending through the apertures.

In testimony that I claim the foregoing as my own, I have hereto affixed my signature in the presence of two witnesses.

BASEL D. KEMP.

Witnesses:
S. H. BEVER,
A. L. BABB.